US011251976B2

(12) United States Patent
Liu

(10) Patent No.: US 11,251,976 B2
(45) Date of Patent: Feb. 15, 2022

(54) DATA SECURITY PROCESSING METHOD AND TERMINAL THEREOF, AND SERVER

(71) Applicant: ADVANCED NEW TECHNOLOGIES CO., LTD., Grand Cayman (KY)

(72) Inventor: Xiaoyun Liu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/314,893

(22) Filed: May 7, 2021

(65) Prior Publication Data
US 2021/0266181 A1 Aug. 26, 2021

Related U.S. Application Data

(63) Continuation of application No. PCT/CN2020/073733, filed on Jan. 22, 2020.

(30) Foreign Application Priority Data

Feb. 26, 2019 (CN) .......................... 201910142774.0

(51) Int. Cl.
H04L 9/32 (2006.01)
(52) U.S. Cl.
CPC .................. *H04L 9/3263* (2013.01)
(58) Field of Classification Search
None
See application file for complete search history.

(56) References Cited

U.S. PATENT DOCUMENTS

| 7,530,103 | B2 | 5/2009 | Willman et al. |
| 7,984,286 | B2 | 7/2011 | Zimmer et al. |
| 8,060,934 | B2 | 11/2011 | Cabuk et al. |
| 8,213,618 | B2 | 7/2012 | Dewan |
| 8,307,193 | B2 | 11/2012 | Sehr et al. |
| 8,583,908 | B2 | 11/2013 | Zimmer et al. |
| 8,595,832 | B1 | 11/2013 | Yee et al. |
| 8,627,414 | B1 | 1/2014 | Mccune et al. |

(Continued)

FOREIGN PATENT DOCUMENTS

| CN | 102857913 A | 1/2013 |
| CN | 105791284 A | 7/2016 |

(Continued)

OTHER PUBLICATIONS

First Search for Chinese Application No. 201910142774.0 dated Dec. 16, 2020.

(Continued)

*Primary Examiner* — Brandon S Hoffman

(57) ABSTRACT

A method for securely processing data includes: acquiring, by a first processor, security data from a second processor of a security server; and performing, by a secure element (SE) application run on the first processor, security processing on a trusted application (TA) of a trusted execution environment (TEE) using the security data. The method is simple to implement, and when combined with device network capabilities, may provide a solution that conforms to the SE while overcoming difficulty in integration and high costs of the hardware SE, thereby reducing costs of an IoT device.

20 Claims, 3 Drawing Sheets

(56) References Cited

U.S. PATENT DOCUMENTS

| | | |
|---|---|---|
| 8,935,746 B2 | 1/2015 | Vetillard |
| 8,950,007 B1 | 2/2015 | Teal et al. |
| 9,177,153 B1 | 11/2015 | Perrig et al. |
| 9,372,984 B2 | 6/2016 | Smith et al. |
| 9,389,933 B2 | 7/2016 | Baumann et al. |
| 9,697,142 B2 | 7/2017 | Koeberl et al. |
| 9,742,559 B2 | 8/2017 | Christodorescu et al. |
| 9,785,801 B2 | 10/2017 | Zimmer et al. |
| 9,832,207 B2 | 11/2017 | Rubakha et al. |
| 9,846,787 B2 | 12/2017 | Johnson et al. |
| 9,904,805 B2 | 2/2018 | Chhabra et al. |
| 9,940,456 B2 | 4/2018 | Nesher et al. |
| 9,996,690 B2 | 6/2018 | Smith et al. |
| 10,241,819 B2 | 3/2019 | Chen et al. |
| 10,303,899 B2 | 5/2019 | Durham et al. |
| 10,402,566 B2 | 9/2019 | Kibalo et al. |
| 10,496,824 B2 | 12/2019 | Raj et al. |
| 10,516,533 B2 | 12/2019 | Mannan et al. |
| 10,530,777 B2 | 1/2020 | Costa |
| 2010/0153721 A1 | 6/2010 | Mellqvist |
| 2013/0304651 A1 | 11/2013 | Smith |
| 2015/0263855 A1 | 9/2015 | Schulz |
| 2015/0318998 A1 | 11/2015 | Erlikhman et al. |
| 2015/0358301 A1 | 12/2015 | Dalbehera et al. |
| 2016/0094573 A1 | 3/2016 | Sood et al. |
| 2016/0191236 A1 | 6/2016 | Smirnoff et al. |
| 2016/0275461 A1* | 9/2016 | Sprague ............... H04L 9/3234 |
| 2018/0367989 A1 | 12/2018 | Zhu et al. |
| 2019/0052916 A1 | 2/2019 | Schwarz et al. |

FOREIGN PATENT DOCUMENTS

| | | |
|---|---|---|
| CN | 105847000 A | 8/2016 |
| CN | 106102054 A | 11/2016 |
| CN | 106506472 A | 3/2017 |
| CN | 107171814 A | 9/2017 |
| CN | 107682159 A | 2/2018 |
| CN | 108055129 A | 5/2018 |
| CN | 108282467 A | 7/2018 |
| CN | 109040147 A | 12/2018 |
| CN | 109922056 A | 6/2019 |
| TW | I562015 B | 12/2016 |
| TW | I606711 B | 11/2017 |

OTHER PUBLICATIONS

Search Report for Taiwanese Application No. 108132765 dated Dec. 22, 2020.
Written Opinion and International Search Report for PCT Application No. PCT/CN2020/073733 dated Apr. 10, 2020.
International Preliminary Report on Patentability Chapter I for PCT Application No. PCT/CN2020/073733 dated Sep. 1, 2021.
Extended Search Report for European Application No. 20 763 256.3 dated Nov. 22, 2021.

* cited by examiner

DATA SECURITY PROCESSING METHOD AND TERMINAL THEREOF, AND SERVER

CROSS REFERENCE TO RELATED APPLICATIONS

This application is a continuation application of International Application No. PCT/CN2020/073733, filed on Jan. 22, 2020, which claims priority to and benefits of Chinese Patent Application No. 201910142774.0 filed on Feb. 26, 2019. The content of the above-referenced applications is incorporated herein by reference in their entirety.

TECHNICAL FIELD

This application relates to the field of information technologies, and in particular, to a method, a terminal, and a server for securely processing data.

BACKGROUND

A secure element (SE) refers to a logic circuit provided in a form of a chip that has an encryption/decryption function in the chip, to prevent external malicious attacks and protect data security. The security of an Internet of Things (IoT) device is usually guaranteed by the SE. However, because of the cost sensitivity of the IoT devices, many devices do not have suitable conditions to configure a hardware SE. It is feasible to simulate an SE using software to provide a solution that balances costs and security.

SUMMARY

An objective of this application is to provide a method, a terminal, and a server for securely processing data, to reduce costs of an IoT device by simulating a secure element (SE) using software.

According to one aspect of this application, a method for securely processing data is provided. The method includes: establishing, by a first processor of a terminal, a secured connection with a second processor of a security server; acquiring, by the first processor, security data comprising key data from the second processor of the security server via the secured connection; and performing, by the first processor executing a secure element (SE) application of the terminal, security processing on a trusted application (TA) of a trusted execution environment (TEE) using the security data. The security processing may include performing, by the first processor executing the SE application, encryption or decryption on data of the TA using the key data acquired from the second processor, wherein the security processing is performed by first processor without using a hardware SE.

In some embodiments, the method further includes: storing the security data in a security storage memory of the terminal.

In some embodiments, the first processor is configured to execute a security certificate management module to acquire security certificate data from the second processor of the security server. The security processing may include performing, by the SE application, certificate verification processing on the TA using the security certificate data acquired from the second processor.

In some embodiments, the first processor is configured to execute a security random number generation module to acquire security random number data from the second processor of the security server. The security processing may include performing, by the SE application, security calculation processing using the security random number data acquired from the second processor.

In some embodiments, the first processor is configured to execute a security algorithm module to acquire security algorithm data from the second processor of the security server. The security processing may include performing, by the SE application, security calculation processing using the security algorithm data acquired from the second processor.

In some embodiments, the method further includes: acquiring, by the first processor, security configuration information from the second processor; performing, by the first processor, security detection on the TEE according to the security configuration information; and sending, by the first processor, security notification information to the second processor if a security event is triggered.

In some embodiments, the method further includes sending, by the second processor, the security data used by the security processing to the first processor, for the terminal to perform the security processing on the TA of the TEE.

In some embodiments, the security data may include at least one of the following: the key data, security certificate data, security random number data, or security algorithm data.

In some embodiments, the method further includes sending, by the second processor, security configuration information to the first processor, for the first processor to perform security detection on the TEE according to the security configuration information; and receiving, by the second processor, security notification information sent by the first processor if a security event is triggered at the terminal.

According to another aspect of this application, a terminal is provided. The terminal includes a first processor and a memory configured with instructions executable by the first processor to cause the first processor to perform operations comprising: establishing a secured connection with a second processor of a security server; acquiring security data from the second processor of the security server; and performing, by a secure element (SE) application, security processing on a trusted application (TA) of a trusted execution environment (TEE) using the security data.

According to a further aspect of this application, one or more non-transitory computer-readable storage media are provided. The one or more non-transitory computer-readable storage media store instructions executable by a first processor of a terminal to cause the first processor to perform operations comprising: establishing a secured connection with a second processor of a security server; acquiring security data from the second processor of the security server; and performing, by a secure element (SE) application, security processing on a trusted application (TA) of a trusted execution environment (TEE) using the security data.

The method, the terminal, and the server for securely processing data provided in this application are simple to implement, and when in combination with device network capabilities, may provide security capabilities that conform to the SE while overcoming the difficulty in integration and high costs of the hardware SE, thereby reducing costs of an IoT device.

BRIEF DESCRIPTION OF THE DRAWINGS

Other features, objectives, and advantages of this application become more obvious by reading the detailed description of non-limiting embodiments that is provided with reference to the following accompanying drawings.

The same or similar reference numerals in the drawings represent the same or similar components.

DETAILED DESCRIPTION OF EMBODIMENTS

This application is further described in detail below with reference to the accompanying drawings.

In a typical configuration of this application, a terminal and a service network device both include one or more processors (CPUs), an input/output interface, a network interface, and a memory.

The memory may include a form such as a volatile memory, a random-access memory (RAM) and/or a nonvolatile memory such as a read-only memory (ROM) or a flash RAM in a computer-readable medium. The memory is an example of the computer-readable medium.

The non-transitory computer-readable medium may include a nonvolatile medium, a volatile medium, a removable medium, and/or a non-removable medium, which may implement storage of information using any method or technology. The information may be computer-readable instructions, a data structure, a program apparatus, or other data. Examples of a storage medium of a computer include, but are not limited to, a phase change memory (PRAM), a static random access memory (SRAM), a dynamic random access memory (DRAM), or other types of RAM, a ROM, an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device.

Figure 1:
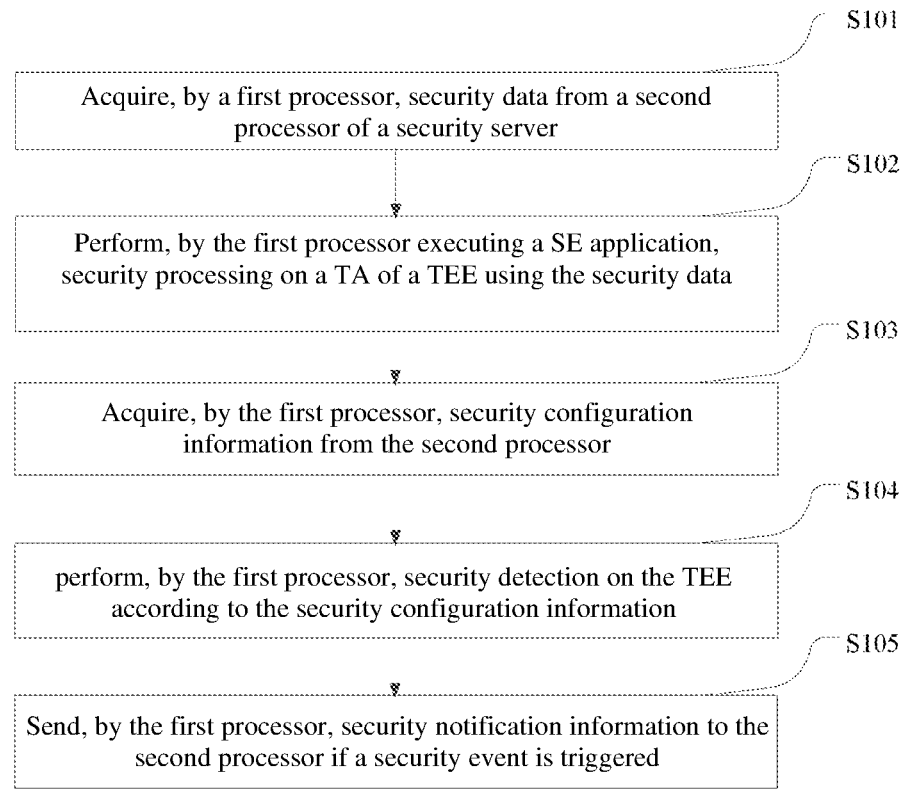
FIG. 1 is a schematic flowchart of a method for securely processing data according to one embodiment of this application.

FIG. 1 is a schematic flowchart of a method for securely processing data according to one embodiment of this application. As shown in FIG. 1, the method provided in this embodiment is applied to a terminal, and the method includes steps S101-S105.

At step S101, the method includes acquiring, by a first processor, security data from a memory associated with a second processor of a security server.

At step S102, the method includes performing, by the first processor executing a secure element (SE) application of the terminal, security processing on a trusted application (TA) of a trusted execution environment (TEE) using the security data.

For example, a first processor may be a microprocessor executing a first security software module and is configured on the terminal, and a second processor may be a microprocessor executing a second security software module and is configured on the security server. In some embodiments, the microprocessors are general microprocessors. The first processor and the second processor jointly complete an SE function, and perform the security processing on the TA of the TEE through a security channel (e.g., a connection secured by a security protocol) without using a hardware SE. The security processing includes at least one of the following: encryption, decryption, certificate verification, and security calculation based on a security algorithm. The first processor communicates with the second processor, to acquire the security data configured by the security server for security processing and stored at a memory of the security server. The security data includes at least one of the following: key data, security certificate data, security random number data, and security algorithm data. After the first processor acquires the security data from the second processor, the security data is used for performing the security processing (e.g., SE applications) such as encryption, decryption, certificate verification, and security calculation on the TA.

In some embodiments, the first processor executes a key management module to acquire security data. The security data includes key data.

In some embodiments, the security processing includes: performing, by the first processor executing the SE application, encryption or decryption processing on processing data of the TA using the key data acquired from the second processor.

For example, some implementations may call for encryption or decryption processing for the TA. The first processor acquires a key from the second processor using the key management module, and the first processor uses the key to request encryption for the TA using the SE application run on the first processor. During encryption, a security algorithm module may be configured to acquire the security algorithm from the second processor for encryption calculation. During the encryption calculation, a security random number generation module may be configured to acquire a security random number from the second processor for encryption calculation. A decryption process is similar to the encryption process, and details are not described herein again.

In some embodiments, the first processor executes a security certificate management module to acquire security data. The security data includes security certificate data. The security processing may include: performing, by first processor executing the SE application, certificate verification processing on the TA using the security certificate data acquired from the second processor.

For example, certificate verification processing can be performed on the TA. The first processor acquires the security certificate data from the second processor using the security certificate management module, and the first processor uses the security certificate data to perform certificate verification on the TA using the SE application run on the first processor.

In some embodiments, the first processor can execute a security random number generation module or a security algorithm module to acquire security data. The security data includes security random number data or security algorithm data. The security processing may include: performing, by the first processor executing the SE application, security calculation processing using the security random number data or security algorithm data acquired from the second processor.

The security algorithm module may be configured to acquire the security algorithm data from the second processor, the security random number generation module may be configured to acquire the security random number data from the second processor, and the first processor uses a security algorithm of the security algorithm data and a security random number in the security random number data to perform encryption or decryption security calculation using the SE application run on the first processor.

The key data, the security certificate data, the security random number data, the security algorithm data, and the like acquired by the first processor from the second processor may be stored in a security storage memory/module of the terminal, to save network traffic.

In the method for securely processing data according to the embodiment of this application, an SE module jointly performed by the first processor and the second processor replaces a hardware SE, and most of functions, for example, key management, security data management, a random number service, an encryption/decryption service, and a signature verification function, being up to the GP standard during running of the SE are provided. The hardware SE does not need to be configured in an IoT device, thereby reducing costs of the IoT device. In addition, because important data required by the key management, security data, random number service, encryption/decryption service, and signature verification service are managed and configured in a centralized manner using the security server, security performance is further improved, thereby facilitating security data management and updating of SE applications and TA applications.

Further, the method according to the embodiment of this application further includes the following steps.

At step S103, the method includes acquiring, by the first processor, security configuration information from the second processor.

At step S104, the method includes performing, by the first processor, security detection on the TEE according to the security configuration information.

At step S105, the method includes sending, by the first processor, the security notification information to the second processor if a security event is triggered.

For example, the security configuration information may include information such as a detection period, a detection object, and an abnormal event feature. The first processor may perform abnormal event detection on a detection object of the TEE according to configuration of the security configuration information and the detection period. When an event is found to meet the abnormal event feature, it is determined to trigger the security event, and the first processor sends a notification to the second processor of the security server to make a security prompt.

Different from the hardware SE that can only be in a passive working state, in the method for securely processing data according to the embodiments of this application, the security configuration information may be proactively sent to the first processor using the second processor, to monitor an anomaly, and a network attack is detected and is reported to the security server in real time by calling a network interface in real time.

Figure 2:
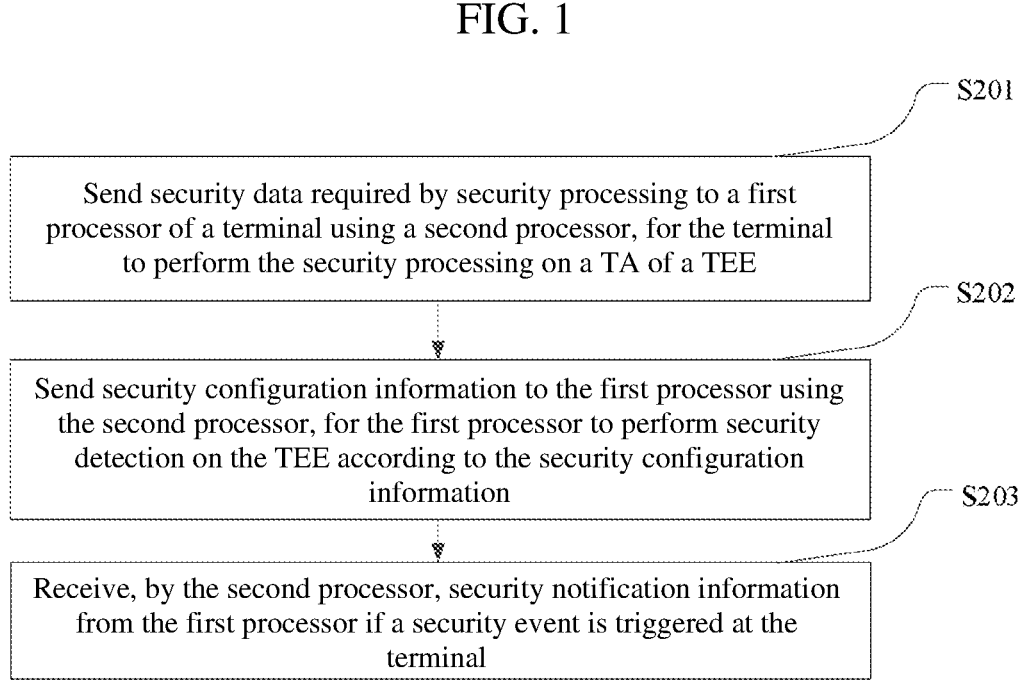
FIG. 2 is a schematic flowchart of a method for securely processing data according to another embodiment of this application.

FIG. 2 is a schematic flowchart of a method for securely processing data according to some embodiments of this application. As shown in FIG. 2, the method is applied to a server, and the method includes steps S201-S203.

At step S201, the method includes sending security data required by security processing to a first processor of a terminal using a second processor, for the terminal to perform security processing on a TA of a TEE.

The first processor may be a microprocessor executing a software module and is configured on the terminal, and the second processor may be a microprocessor executing a software module and is configured on a security server. The first processor and the second processor jointly perform an SE function, and perform the security processing on the TA of the TEE through a security channel. The security processing includes at least one of the following: encryption, decryption, certificate verification, and security calculation based on a security algorithm. The first processor communicates with the second processor, to acquire the security data configured by the security server for security processing. The security data includes at least one of the following: key data, security certificate data, security random number data, and security algorithm data. After the first processor acquires the security data from the second processor, the security data is used for performing the security processing (e.g., SE applications) such as encryption, decryption, certificate verification, and security calculation on the TA.

Further, the security data includes at least one of the following: key data, security certificate data, security random number data, and security algorithm data.

For example, the first processor acquires the key data from the second processor using the key management module, acquires the security certificate data from the second processor using the security certificate management module, acquires the security algorithm data from the second processor using the security algorithm module, and acquires the security random number data from the second security module using the security random number generation module.

In the method for securely processing data according to the embodiments of this application, an SE module jointly implemented by the first processor and the second processor replaces a hardware SE, and most of functions, for example, key management, security data management, a random number service, an encryption/decryption service, and a signature verification capability, being up to the GP standard during running of the SE are provided. The hardware SE does not need to be configured in an IoT device, thereby reducing costs of the IoT device. In addition, because important data required by the key management, security data, random number service, encryption/decryption service, and signature verification service are managed and configured in a centralized manner using the security server, security performance is further improved, thereby facilitating security data management and updating of SE applications and TA applications.

Further, the method for securely processing data according to the embodiments of this application further includes the following steps.

At step S202, the method includes sending security configuration information to the first processor using the second processor, for the first processor to perform security detection on the TEE according to the security configuration information.

At step S203, the method includes receiving, by the second processor, the security notification information from the first processor if a security event is triggered at the terminal.

For example, the security configuration information may include information such as a detection period, a detection object, and an abnormal event feature. The first processor may perform abnormal event detection on a detection object of the TEE according to configuration of the security configuration information and the detection period. When an event is found to meet the abnormal event feature, it is determined to trigger the security event, and the first processor sends a notification to the second processor of the security server to make a security prompt to the security server.

Different from a hardware SE that can only be in a passive working state, in the method for securely processing data according to the embodiments of this application, the security configuration information may be proactively sent to the first processor using the second processor, to monitor an anomaly, and a network attack is sensed and is reported to the security server in real time by calling a network interface in real time.

Figure 3:
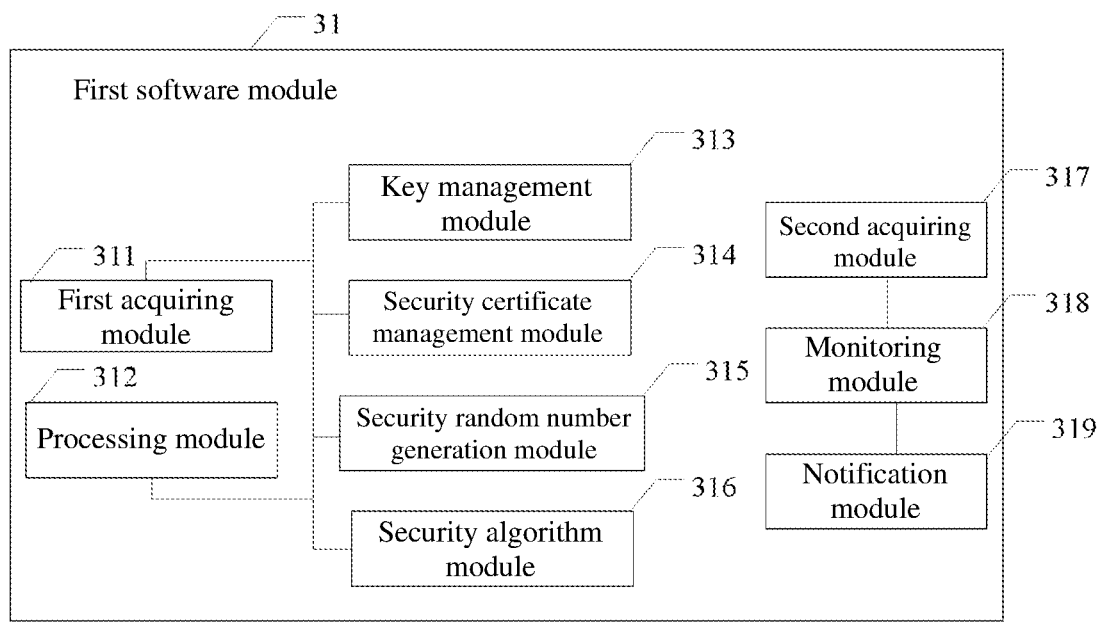
FIG. 3 is a schematic structural diagram of a terminal according to yet another embodiment of this application.

FIG. 3 is a schematic structural diagram of a terminal according to some embodiments of this application. As shown in FIG. 3, the terminal provided in the embodiments of this application includes a first software module 31 executable by a processor of the terminal. The first software module 31 may be stored in a memory of the terminal associated with the processor of the terminal.

The first software module 31 includes a first acquiring module 311 and a processing module 312. The first acquiring module 311 is configured to acquire security data from a second processor of a security server. The processing module 312 is configured to manage an SE application and the security data. The SE application performs security processing on a TA of a TEE using the security data. In some embodiments, the security data includes key data.

The first software module 31 may further include a key management module 313. The key management module 313 is configured to manage the key data. The SE application performs encryption/decryption processing on processing data of the TA using the key data acquired from the second processor. In some embodiments, the security data includes security certificate data.

The first software module 31 may further include a security certificate management module 314. The security certificate management module 314 is configured to manage the security certificate data. The SE application performs certificate verification processing on the TA using the security certificate data acquired from the second processor.

In some embodiments, the security data includes security random number data. The first software module 31 further includes a security random number generation module 315. The security random number generation module 315 is configured to manage the security random number data.

In some embodiments, the security data includes security algorithm data. The first software module 31 further includes a security algorithm module 316. The security algorithm module 316 is configured to manage the security algorithm data. The SE application performs security calculation processing using the security random number data or security algorithm data acquired from the second processor.

In some embodiments, the first software module 31 may further include a second acquiring module 317, a monitoring module 318, and a notification module 319. The second acquiring module 317 is configured to acquire security configuration information from the second processor. The monitoring module 318 is configured to perform security detection on the TEE according to the security configuration information. The notification module 319 is configured to send the security notification information to the second processor if a security event is triggered.

The terminal according to the embodiments of this application is an implementation apparatus of the method for securely processing data shown in FIG. 1. Reference may be made to the embodiment in FIG. 1, and details are not described herein again.

Figure 4:
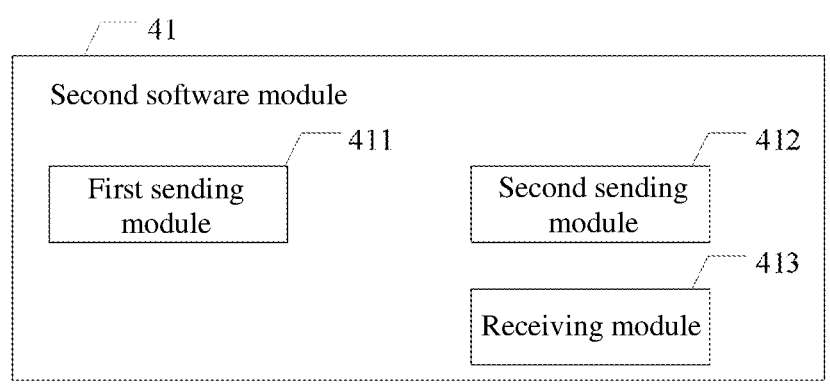
FIG. 4 is a schematic structural diagram of a server according to yet another embodiment of this application.

FIG. 4 is a schematic structural diagram of a server according to some embodiments of this application. As shown in FIG. 4, the server provided in the embodiments of this application includes a second software module 41. The second software module 41 may be stored in a memory of the server associated with the processor of the server.

The second software module 41 includes a first sending module 411. The first sending module 411 is configured to send security data required by security processing to a first processor of a terminal, for the terminal to perform security processing on a TA of a TEE.

In some embodiments, the security data includes at least one of the following: key data, security certificate data, security random number data, and security algorithm data.

In some embodiments, the second software module 41 includes a second sending module 412 and a receiving module 413. The second sending module 412 is configured to send security configuration information to the first processor, for the first processor to perform security detection on the TEE according to the security configuration information. The receiving module 413 is configured to receive the security notification information sent by the first processor if a security event is triggered at the terminal.

The server according to the embodiments of this application is an implementation apparatus of the method for securely processing data shown in FIG. 2. Reference may be made to the embodiment in FIG. 2, and details are not described herein again.

Figure 5:
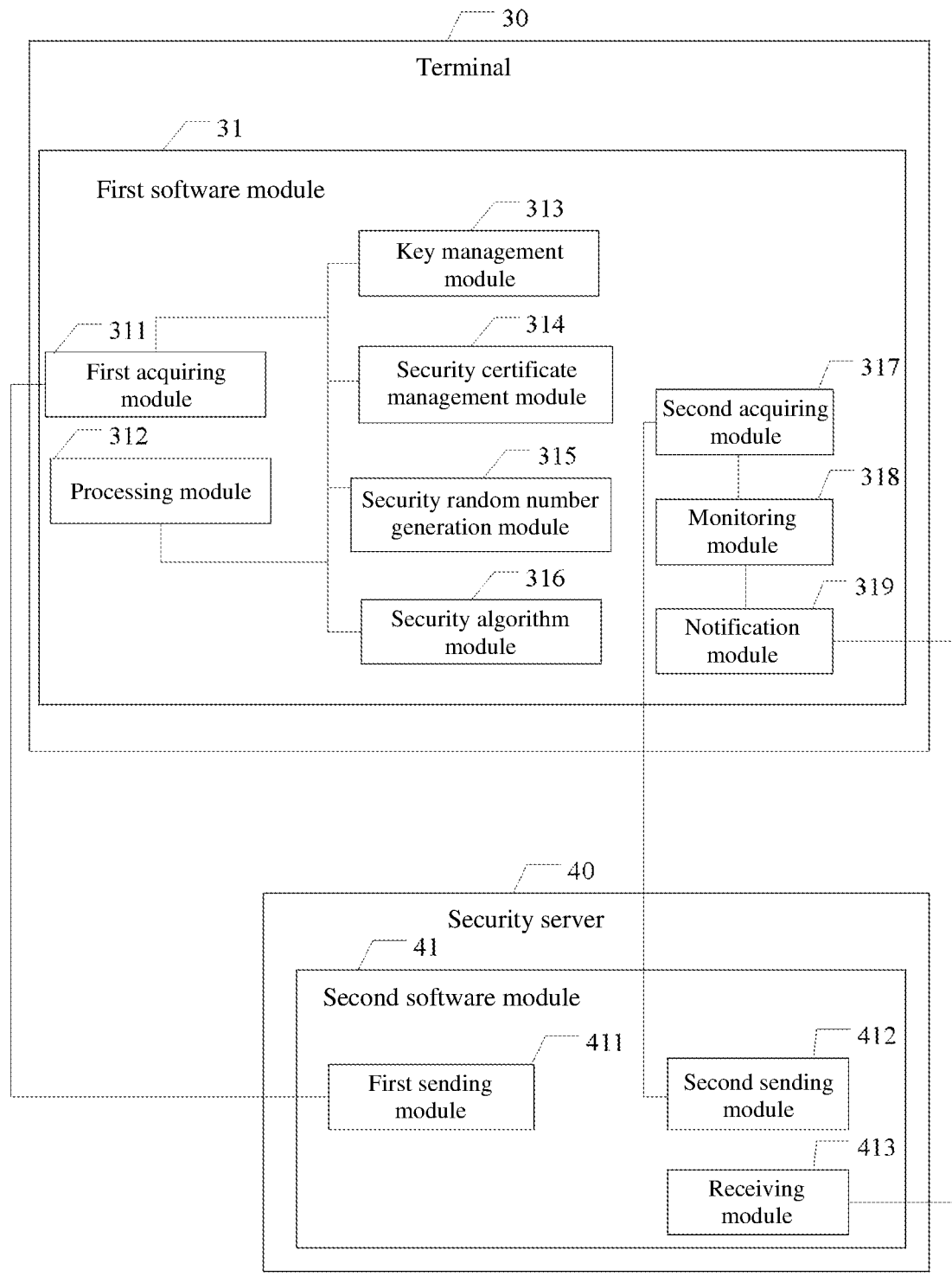
FIG. 5 is a schematic diagram of connection of a terminal and a server according to yet another embodiment of this application.

FIG. 5 is a schematic diagram of connection of a terminal and a server according to some embodiments of this application. As shown in FIG. 5, a terminal 30 is provided with the first software module 31 executable by a processor of the terminal, and a security server 40 is provided with the second software module 41 executable by a processor of the security server 40.

The first software module 31 acquires security data from the first sending module 411 of the second software module 41 using the first acquiring module 311. The security data includes at least one of the following: key data, security certificate data, security random number data, and security algorithm data. The key management module 313 acquires the key data from the first acquiring module 311 and manages the key. The security certificate management module 314 acquires the security certificate data from the first acquiring module 311 and manages the security certificate. The security random number generation module 315 acquires the security random number data from the first acquiring module 311 and manages the security random number. The security algorithm module 316 acquires the security algorithm data from the first acquiring module 311 and manages the security algorithm. The processing module 312 of the first software module 31 manages the SE application. When the SE application needs to use the security data, the processing module 312 respectively retrieves the key, the security certificate, the security random number, the security algorithm, and the like from the key management module 313, the security certificate management module 314, the security random number generation module 315, and the security algorithm module 316, to perform security processing on the TA.

The first software module 31 acquires the security configuration information from the second sending module 412 of the second software module 41 using the second acquiring module 317, and the monitoring module 318 performs security detection on the TEE according to the security configuration information. If a security event is triggered, the notification module 319 sends the security notification information to the receiving module 413 of the second software module 41, to prompt the security server that the TEE located at the terminal is abnormal.

The embodiments of this application further provide a storage device. The storage device stores computer program instructions, and the computer program instructions implement the method according to the embodiments of this application.

The embodiments of this application further provide a terminal. The terminal includes a memory configured to store computer program instructions and a processor configured to execute the computer program instructions, where when executed by the processor, the computer program instructions trigger the terminal to perform the method according to the embodiments of this application.

According to a further aspect of this application, a server is provided. The server includes a memory configured to store computer program instructions and a processor configured to execute the computer program instructions, where when executed by the processor, the computer program instructions trigger the server to perform the method according to the embodiments of this application.

The terminal described in this application includes but not limited to any electronic product that can perform human-computer interaction (for example, perform human-computer interaction using a touchpad) with a user, such as a smartphone, a tablet computer, or another mobile electronic product. The mobile electronic product may use any operating system such as Android operating system or iOS operating system. The server includes an electronic device that can automatically perform numerical calculation and information processing according to predetermined or pre-stored instructions. Hardware of the server includes but not limited to a microprocessor, an application-specific integrated circuit (ASIC), a programmable logic device (PLD), a field programmable gate array (FPGA), a digital signal processor (DSP), an embedded device, and the like. The server includes but not limited to a computer, a network host, a single network server, a plurality of network server sets, or a cloud formed by a plurality of servers. Herein, the cloud is formed by a large number of computers or network servers based on cloud computing, where the cloud computing is one type of distributed computing, and the cloud is a virtual supercomputer formed by a group of loosely-coupled computer sets. The network includes but not limited to the Internet, a wide area network, a metropolitan area network, a local area network, a VPN network, a mobile ad-hoc network, and the like. In some embodiments, the terminal and the server may further be programs running on the terminal, the server, or a device formed by integration of the terminal and the server through the network.

It should be noted that this application may be implemented by hardware and/or software, or a combination of software and hardware, for example, may be implemented using an ASIC, a general-purpose computer, or any other similar hardware device. In some embodiments, software programs of this application may be performed by a processor to implement the foregoing steps or functions. Similarly, the software programs (including a related data structure) of this application may be stored in a computer-readable recording medium, for example, a RAM, a magnetic or optical drive or floppy disk and similar devices. In addition, some steps or functions of this application may be implemented using hardware, for example, a circuit that cooperates with a processor to perform various steps or functions.

It should be appreciated by a person skilled in the art that this application is not limited to details in the foregoing exemplary embodiments, and this application can be implemented in another specific form without departing from the spirit or basic features of this application. Therefore, the embodiments should be considered to be exemplary in all respects and not limitative. The scope of this application is not defined by the foregoing description but by the appended claims. This application is intended to include all the variations that are equivalent in significance and scope to the claims. No reference numerals in the claims should be considered as limitations to the related claims. In addition, it should be understood that the term "comprise", "include" or any variant thereof does not exclude other units or steps, and the singular does not exclude the plural. A plurality of units or apparatuses described in the apparatus claims may also be implemented by a unit or an apparatus by software or hardware. The words such as "first" and "second" are only used to denote names, and do not denote any particular order.

What is claimed is:

1. A method for securely processing data, comprising:
establishing, by a first processor of a terminal, a secured connection with a second processor of a security server;
acquiring, by the first processor, security data comprising key data from the second processor of the security server via the secured connection; and
performing, by the first processor executing a secure element (SE) application of the terminal, security processing on a trusted application (TA) of a trusted execution environment (TEE) using the security data, wherein the security processing comprises: performing, by the first processor executing the SE application, encryption or decryption on data of the TA using the key data acquired from the second processor, wherein the security processing is performed by first processor without using a hardware SE.

2. The method according to claim 1, further comprising:
storing the security data in a security storage memory of the terminal.

3. The method according to claim 1, wherein:
the first processor is configured to execute a security certificate management module to acquire security certificate data from the second processor of the security server; and
the security processing comprises: performing, by the SE application, certificate verification processing on the TA using the security certificate data acquired from the second processor.

4. The method according to claim 1, wherein:
the first processor is configured to execute a security random number generation module to acquire security random number data from the second processor of the security server; and
the security processing comprises: performing, by the SE application, security calculation processing using the security random number data acquired from the second processor.

5. The method according to claim 1, wherein:
the first processor is configured to execute a security algorithm module to acquire security algorithm data from the second processor of the security server; and
the security processing comprises: performing, by the SE application, security calculation processing using the security algorithm data acquired from the second processor.

6. The method according to claim 1, further comprising:
acquiring, by the first processor, security configuration information from the second processor;

performing, by the first processor, security detection on the TEE according to the security configuration information; and sending, by the first processor, security notification information to the second processor if a security event is triggered.

7. The method according to claim 1, further comprising:
sending, by the second processor, the security data used by the security processing to the first processor, for the terminal to perform the security processing on the TA of the TEE.

8. The method according to claim 7, wherein the security data comprises at least one of the following: the key data, security certificate data, security random number data, or security algorithm data.

9. The method according to claim 7, further comprising:
sending, by the second processor, security configuration information to the first processor, for the first processor to perform security detection on the TEE according to the security configuration information; and
receiving, by the second processor, security notification information sent by the first processor if a security event is triggered at the terminal.

10. A terminal comprising: a first processor and a memory configured with instructions executable by the first processor to cause the first processor to perform operations comprising:
establishing a secured connection with a second processor of a security server;
acquiring security data comprising key data from the second processor of the security server via the secured connection; and
performing, by a secure element (SE) application of the terminal, security processing on a trusted application (TA) of a trusted execution environment (TEE) using the security data, wherein the security processing comprises: performing, by the SE application, encryption or decryption on data of the TA using the key data acquired from the second processor, wherein the security processing is performed without using a hardware SE.

11. The terminal according to claim 10, wherein the operations further comprise:
storing the security data in a security storage memory of the terminal.

12. The terminal according to claim 10, wherein:
the first processor is configured to execute a security certificate management module to acquire security certificate data from the second processor of the security server; and
the security processing comprises: performing, by the SE application, certificate verification processing on the TA using the security certificate data acquired from the second processor.

13. The terminal according to claim 10, wherein:
the first processor is configured to execute a security random number generation module to acquire security random number data from the second processor of the security server; and
the security processing comprises: performing, by the SE application, security calculation processing using the security random number data acquired from the second processor.

14. The terminal according to claim 10, wherein:
the first processor is configured to execute a security algorithm module to acquire security algorithm data from the second processor of the security server; and
the security processing comprises: performing, by the SE application, security calculation processing using the security algorithm data acquired from the second processor.

15. The terminal according to claim 10, wherein the operations further comprise:
acquiring security configuration information from the second processor;
performing security detection on the TEE according to the security configuration information; and
sending security notification information to the second processor if a security event is triggered.

16. One or more non-transitory computer-readable storage media storing instructions executable by a first processor of a terminal to cause the first processor to perform operations comprising:
establishing a secured connection with a second processor of a security server;
acquiring security data comprising key data from the second processor of the security server via the secured connection; and
performing, by a secure element (SE) application of the terminal, security processing on a trusted application (TA) of a trusted execution environment (TEE) using the security data, wherein the security processing comprises: performing, by the SE application, encryption or decryption on data of the TA using the key data acquired from the second processor, wherein the security processing is performed without using a hardware SE.

17. The one or more non-transitory computer-readable storage media according to claim 16, wherein:
the first processor is configured to execute a security certificate management module to acquire security certificate data from the second processor of the security server; and
the security processing comprises: performing, by the SE application, certificate verification processing on the TA using the security certificate data acquired from the second processor.

18. The one or more non-transitory computer-readable storage media according to claim 16, wherein:
the first processor is configured to execute a security random number generation module to acquire security random number data from the second processor of the security server; and
the security processing comprises: performing, by the SE application, security calculation processing using the security random number data acquired from the second processor.

19. The one or more non-transitory computer-readable storage media according to claim 16, wherein:
the first processor is configured to execute a security algorithm module to acquire security algorithm data from the second processor of the security server; and
the security processing comprises: performing, by the SE application, security calculation processing using the security algorithm data acquired from the second processor.

20. The one or more non-transitory computer-readable storage media according to claim 16, wherein the operations further comprise:
acquiring security configuration information from the second processor;
performing security detection on the TEE according to the security configuration information; and sending security notification information to the second processor if a security event is triggered.

\* \* \* \* \*